United States Patent [19]

Goronszy

[11] Patent Number: 4,663,044
[45] Date of Patent: May 5, 1987

[54] BIOLOGICAL TREATMENT OF WASTEWATER

[75] Inventor: Mervyn C. Goronszy, Cremorne, Australia

[73] Assignee: Transfield, Incorporated, Irvine, Calif.

[21] Appl. No.: 775,648

[22] Filed: Sep. 13, 1985

[51] Int. Cl.⁴ .............................................. C02F 3/12
[52] U.S. Cl. .................................. 210/610; 210/619; 210/624; 210/903; 210/906
[58] Field of Search ........ 210/607, 610, 619, 623–626, 210/903, 906, 629, 631

[56] References Cited

U.S. PATENT DOCUMENTS

| | | | |
|---|---|---|---|
| 3,915,854 | 10/1975 | Torpey | 210/619 |
| 4,179,366 | 12/1979 | Kaelin | 210/623 X |
| 4,183,809 | 1/1980 | Klapwijk et al. | 210/607 X |
| 4,421,648 | 12/1983 | Besik | 210/619 X |
| 4,431,543 | 2/1984 | Matsuo et al. | 210/906 X |
| 4,468,327 | 8/1984 | Brown et al. | 210/626 |
| 4,479,876 | 10/1984 | Fuchs | 210/903 X |
| 4,537,682 | 8/1985 | Wong-Chong | 210/626 X |

Primary Examiner—Tom Wyse
Attorney, Agent, or Firm—Grant L. Hubbard

[57] ABSTRACT

A wastewater treatment reaction vessel is operated with repeated sequences of aeration and non-aeration, using a single vessel or multiple vessels alternately, activated sludge which is acclimated for BOD reduction, nitrification or biological denitrification and phosphorus removal is absorptively reacted with influent wastewater, and the combined flow is passed into subsequent absorptive reactor volumes, reducing the BOD such that the effluent BOD is less than twenty percent that of the influent.

49 Claims, 15 Drawing Figures

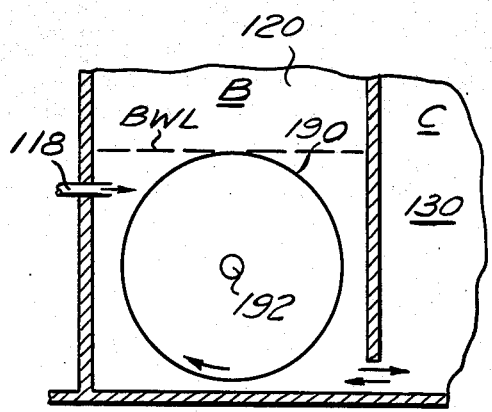
Fig. 11
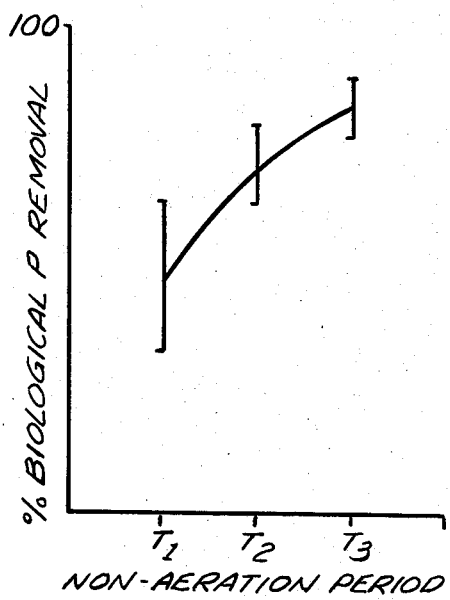
Fig. 15
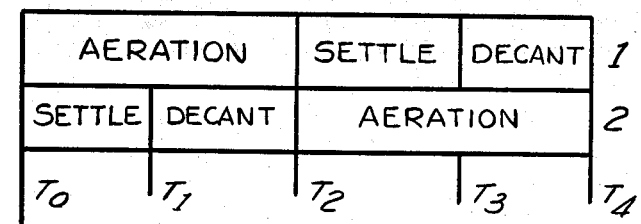
Fig. 13
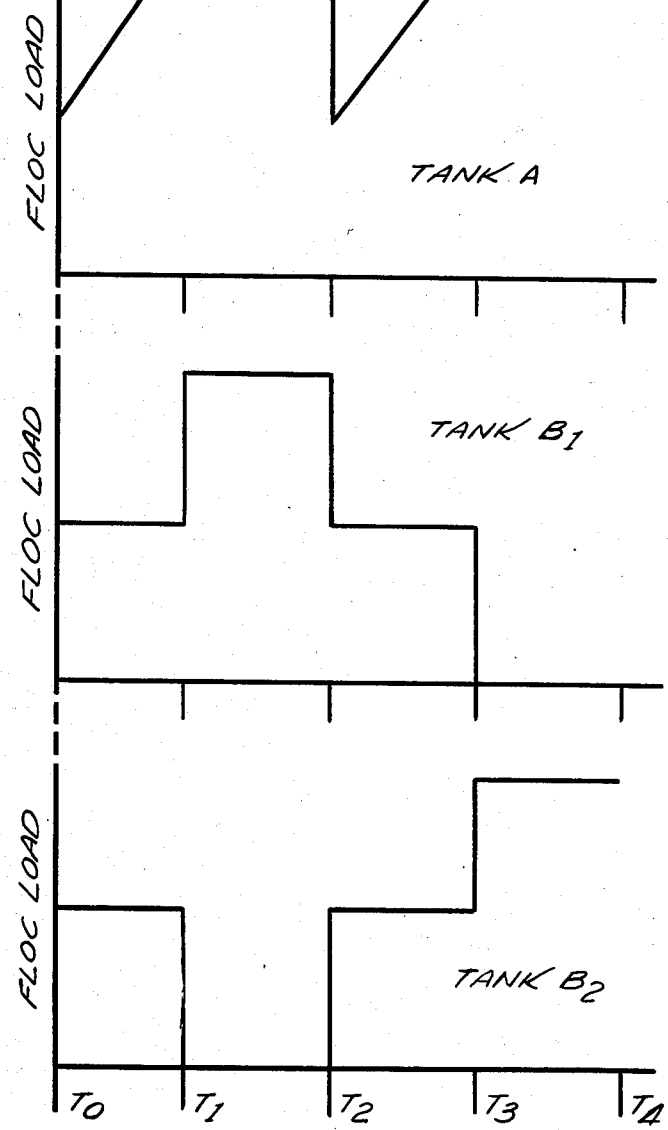

BIOLOGICAL TREATMENT OF WASTEWATER

FIELD OF THE INVENTION

This invention relates to activated sludge wastewater treatment systems. Specifically, this invention relates to treatment of municipal sewage and industrial wastewater using dispersed growth and/or attached growth biomass to generate a high quality effluent from which nitrogen and phosphorus removal has been effected and which is cost and energy efficient.

ABBREVIATIONS

The following abbreviations are used in this specification:
- ATP: Cellular Adenosine TriPhosphate
- BOD: Biochemical Oxygen Demand (mg/L)
- BWL: Bottom Water Level
- COD: Chemical Oxygen Demand (mg/L)
- F: Floc-Load; substrate to biomass ratio, mg BOD/mg MLSS or mg BOD/mg MLVSS
- MCRT: Mean cell residual time (days)
- MLSS: Mixed Liquor Suspended Solids
- MLVSS: Mixed Liquor Volatile Suspended Solids
- PV: Permanganate Value
- SOUR: Specific Oxygen Uptake Rate
- TKN: Total Kjeldahl Nitrogen (Total Nitrogen as determined by standard Kjeldahl analysis)
- TOC: Total Organic Carbon
- TWL: Top Water Level
- Conventional dimensional abbreviations, e.g. g=gram, mg=milligram, L=liter, ml=milliliter, etc. are also used.

BACKGROUND OF THE INVENTION

Previous activated sludge methodology has used various continuous flow configurations comprising a primary solids settlement tank, an aeration tank and a secondary solids settlement tank. Solids are removed from the secondary solids settlement tank and returned to the aeration tank in order to maintain a stable solids concentration therein. Treatment of wastewater has also been achieved in intermittently aerated activated sludge systems both with and without primary solids settling. With all activated sludge configurations, their process efficiency is drastically affected by sludge bulking conditions, a situation where activitated sludge solids exhibit a low zone settling velocity, sufficient to cause these solids to be lost from the treatment system. This loss of solids and associated treatment process upsets take considerable time to rectify.

For a biological treatment process in general and particularly the activated sludge process to be effective and economically viable, it is essential that the biomass exhibit good settling properties in order that efficient gravitational solids-liquid separation can be practiced. A number of circumstances can arise which have been reported to contribute to the generation of a non-flocculating biomass (bulking sludge) which has poor settling properties and thus impose an impediment to the cost effectiveness of the activated sludge process as a method of biological wastewater treatment. The number and type of microorganisms which can contribute to or cause a non-flocculating biomass are numerous and quite prolific. The growth of such organisms is known to be associated with the treatment of domestic wastes, readily degradable high strength predominately carbohydrate type of wastes such as those generated in the food, potato, milk, brewing and similar processing industries, or an admixture of such wastes in any proportion.

A number of approaches have been suggested since the activated sludge process was initially developed, in order to alleviate sludge bulking conditions, the majority having been modifications to the conventional continuous feed continuously aerated configuration with separate clarifier and continuous return activated sludge. Some of these include tapered feed and aeration combinations, the use of aerobic and anoxic subreactors or zones, initial small volume anoxic, aerobic or anaerobic reactors for contacting the return activated sludge with the influent waste flow and various chemicals to selectively limit or kill the growth of non-flocculating portion of the biomass. The success of these modifications and variations has been varied and often has produced inconsistent results.

In order to achieve best possible solids-liquid separation it is necessary that the biomass contain a relatively small portion of the non-flocculating type of organisms. This enhances the ability of the biomass to entrap coarse, fine and colloidal particulate matter which, if not removed in the solids-liquid separation unit operation, requires a separate costly filtration or other type of process unit operation for its removal. The nature of the non-flocculating biomass enables strong solid bridging mechanisms, with high intra solid attractive forces assisted by micro particulate biocoagulation involving extra cellular polymer compounds, to take place within the biomass. The absence of some non-flocculating microorganisms in the biomass leads to pin-point type of sludge or to a type that results in a turbid liquid layer during and following the settling operation. This also means that the efficiency of the process is reduced necessitating the addition of other processes or unit operations to remedy the deleterious situation. One solution to poor solids-liquid separation has been to increase the area and liquid depth of the solids-liquid separation unit and thus the hydraulic retention time of the unit. There is a limit to the hydraulic retention time that can be used in practice due to anaerobic and/or anoxic biological transformations which can take place within the biomass. Too low a solids flux combined with too long a period whereby the biomass is in a non-aerobic condition only leads to a further loss in process efficiency and cost effectiveness due to the need to use additional processes or unit operations.

In conventional activated sludge wastewater treatment methodology two flow configurations can be described, complete mix or plug-flow. Tracer studies to determine hydraulic residence time distributions and dispersion number characteristics, a dimensionless number describing diffusive mixing and transport, essentially describe the flow predominance of the configuration. A dispersion number of or near to 0 essentially describes a plug-flow configuration while a large value of the dispersion number, approaching infinity, describes an essentially completely mixed configuration. Activated sludge systems operating, or predominantly operating, in the complete mix configuration are very prone to generation of sludges which bulk and which are identified as having a low zone settling velocity i.e. poor solids-liquid separation. Such configuration is specially unsuited to the treatment of readily degradable food processing types of wastes or to domestic wastewaters where a high level of ammonia removal is required. In such cases bulking sludge or biomass exhibiting poor solids-liquid separation severely limits the efficacy of the process.

The hydraulic residence time distribution can also be used to fit various hydraulic models, which also describe the degree of plug-flow, in the form of a certain number of smaller completely mixed reactors connected in series which in total exhibit the plug-flow behavior. An equivalent four reactors in series is known to approximate a plug-flow hydraulic configuration. Added to this type of model, is the ability to be able to describe, bypass, backmix, bypass and dead volume fractions in the flow configuration.

Wastewaters are characteristically described by parameters which quantify their oxygen consuming potential, solids content and the availability of other essential nutrients necessary for a healthy and efficiently operating biological treatment process. The concentration terms in domestic wastewaters are a function of the volume ratio of water that is used to transport the wastes to the treatment facility, the diet of the population contributing to the system and the residence time of the combined water and wastes in the sewerage system. The principal treatment parameters are hence the carbonaceous oxygen consuming fraction (or organics) variously determined as BOD (Biochemical Oxygen Demand), COD (Chemical Oxygen Demand), PV (Permanganate Value), TOC (Total Organic Carbon) and the nitrogenous oxygen consuming fraction described as TKN (total Kjeldahl nitrogen), organic nitrogen, ammonia nitrogen or free and saline ammonia, and nitrite nitrogen. These parameters can be used as a measure of the soluble, colloidal and particulate forms and their various fractions. For example, domestic wastewaters may have an associated BOD and a suspended solids content ranging from some 350 mg/L to a low value of about 90 mg/L for each parameter depending on the amount of water in the carrier system. TKN is similarly variable from about 80 mg/L to lower concentrations. On a practical basis particulate matter contributes to about 50 percent of the BOD (or other parameters). The soluble and colloidal matter makes up the other 50 percent with the colloidal fraction contributing about 15 percent. Domestic sewage may contain less then about 60 mg/L of soluble BOD (or other parameter).

The characteristics of industrial wastewaters are a function of the process they are derived from. Industrial wastewaters from the food industries, such as potato, milk, vegetable, brewery industries have a high BOD (or other parameter) in which the soluble fraction also leads to a high BOD (or other parameter) in the range of 200 to 2000 mg/L. Wastewaters having a total BOD (or other equivalent parameter) in excess of about 3000 mg/L are generally not economically amenable to biodegradation by an aerobic process alone such as the activated sludge process. For the purpose of demonstrating this invention a typical domestic wastewater having a total BOD of about 300 mg/L will be considered; however, the invention and its application is not limited to this strength or type of waste.

It is generally observed that BOD removal by the activated sludge and other biological processes takes place by storage, synthesis and oxidation mechanisms in which all three processes occur simultaneously. These assumed basic mechanisms can be enhanced, the extent of which is determined by the net hydraulic flow configuration. Absorption of soluble substances (organics) by microorganisms is thought to take place by enzyme transport together with diffusive mechanisms. It is a rapid interaction the amount of which is determined by the ability of the active organisms of the biomass to absorb; the latter is functional on the population of intra and extra cellular enzymes that are available, the fraction of receptive transport sites or centers associated with the microorganisms, the fraction of previously absorbed material that remains in an unmetabolized state, i.e. the concentration driving forces, all of which are related to the active mass fraction of the biomass. The active mass fraction has sometimes been described as the viable fraction or the degradable fraction. This invention provides a process whereby the degradable fraction property of biomass and its ability to absorb soluble substrate is maximized.

The transport of soluble substrate (organics) by enzymatic mechanisms, or absorption, is an energy intensive reaction, the magnitude of which can be shown by the specific oxygen uptake rate (SOUR) of the biomass before and after substrate contact. Synthesis reactions and cellular growth do not necessarily occur on the onset of absorption. Cellular growth mechanism do not begin to function for some considerable time lag after absorptive transport saturation as can be evidenced by cellular Adenosine Tri-Phosphate (ATP) concentrations.

A typical bioresponse profile during and following absorption is described in FIG. 1. Two situations are shown in FIG. 1, one where aeration of the biomass is in the presence of residual unabsorbed substrate (curve I) and one where aeration of the biomass takes place in the absence of residual unabsorbed susbstrate (curve II). The second bioresponse was obtained by centrifugal separation of biomass and substrate whereby the volume of removed substrate was replaced with distilled water containing a supply of necessary nutrients. Bioprofile I therefore describes the oxygen mass required for substrate absorbed together with biodegradation of residual substrate not initially absorbed. Bioprofile II essentially describes the oxygen mass required to metabolize initially absorbed substrate. The mechanism of absorption is quite different from that of adsorption. Adsorption is a surface attraction phenomena which only accounts for very minimal substrate removal on contact with biomass. A maximum of about 3 to 5 percent under optimum circumstances can be realized. On the other hand, absorption of soluble substrate of up to 90 percent at practical floc-loading can be achieved.

It has been mentioned that the absorption potential or efficiency of a biomass is measurable by the initial magnitude of and the resulting elevation of the specific oxygen utilization rate (SOUR) of that biomass. The absorption potential of a biomass is also functional on the fraction of that biomass that is active and degradable, that latter being determined by the organic loading or mean cell residence time of the biomass. This is graphically depicted in FIG. 2.

The magnitude of the elevation in the SOUR bioprofile is also dependent on the initial substrate to biomass ratio termed the floc-load (F). This is shown schematically in FIG. 3. Units of floc-load are described as mg BOC, COD, TOC, PV per g biomass. Biomass may be described as mixed liquor suspended solids (MLSS), mixed liquor volatile suspended solids, (MLVSS). The degradable mass of either MLSS or MLVSS on the surface or near surface layers of biomass in an attached growth system expressed in the same terms of oxygen utilization provides a measure of the substrate saturation capacity of that particular biomass. The initial absorption mechanism is quick, the major fraction of substrate transport taking place in only about 10 to 20 minutes. Little absorption takes place after about 45 minutes. Therefore the absorption mechanism results in a reduction in substrate concentration as shown generally in FIG. 4.

The percentage removal and floc-load relationship is waste specific and also functional on the active or degradable fraction of the biomass and the relative magnitude of SOUR existing on initiation of absorption mechanisms with respect to the magnitude associated with viable biomass in a nonabsorption state viz initial value of SOUR. The absorption potential of a biomass is limited in the first instance, as shown in FIG. 5, by the active or degradable fraction of the biomass, by the floc-load and by the availability of receptor transfer sites or storage capacity for that degradable fraction of biomass.

Extended periods of aeration of the contacting biomass or contacting of biomass which has experienced prolonged periods without the presence of oxygen reduces the absorption potential of that biomass, as depticted in FIG. 6.

The magnitude of percent of substrate absorbed, relative to the criteria described above, at a specific floc-load is instrumental in determining the sludge settling characteristics of the biomass following conventional aeration periods.

For some time now it has been recognized that there is a need to improve activated sludge wastewater treatment methodology, for both domestic and high soluble BOD industrial wastewaters, in order to be able to economize on both capitol equipment and operating costs. This may be brought about by manipulating and optimizing the biological processes in order to provide consistent degradation together with consistent and good sludge settlement behavior.

The following patents and publications provide various background information and details of certain apparaus, systems and processes which may be used in connection with the present invention.

U.S. Pat. Nos. 2,852,140, MacLaren, 3,053,390, Wood, 3,202,285, Williams, 3,415,378, Fukuda, and 3,433,359, Lundin et al. Tank structure and aeration apparatus are disclosed.

U.S. Pat. No. 3,264,213, Pav. Describes an activated sludge process.

U.S. Pat. No. 3,524,547, Nicol. A sewage treatment plant utilizing aeration is described, which includes an inlet compartment and two treatment compartments. Sewage from the inlet compartment is transferred substantially contemporaneously from the inlet compartment into the first of the treatment compartments and from first treatment compartment to the second treatment compartment and treated sewage is removed from the second treatment compartment. The flow is then reversed, flow being from the inlet compartment to the second treatment compartment to the first compartment and then from the system. The two treatment compartments thus serve, alternately, as the first and second treatment stages.

U.S. Pat. No. 3,530,990, Grimshaw. An aeration system and apparatus is described which, if desired, could be adapted to provide for aeration in the present invention. Aeration apparatus per se is not part of the present invention, however, and any aeration apparatus may be adapted for use in the present invention.

U.S. Pat. No. 3,732,160, Klock. A fixed film digestion material, referred to as a "filter", which presents absorption media to the sewage is described. The substrate for the film may be plates, spheres, etc.

U.S. Pat. No. 3,805,957, Oldham. Tank structure, aeration and circulation are described.

U.S. Pat. No. 4,069,147, Abrams, et al. Multiple tank system with aeration is described.

U.S. Pat. No. 4,081,368, Block et al. A multiple compartment activated sludge treatment system with recycle of activated sludge is described.

U.S. Pat. No. 4,206,047, Mandt. A multi-stage waste water treatment system involving aeration and mixing, utilizing pure oxygen is described.

U.S. Pat. No. 4,152,259, Molvar. Aeration apparatus.

U.S. Pat. No. 4,290,887, Brown, et al. A weir arrangement for decanting treated wastewater may optionally be used with the present invention; however, any decanting apparatus may be used.

U.S. Pat. No. 4,468,327, Brown, et al. A single vessel treatment process is described. Aeration, decanting and various other apparatus may be used with the present invention. Reference is made to the subject patent for a discussion of various aspects of the activated sludge digestion process which, in a very broad sense, relates to the present invention. U.S. Pat No. 4,468,327 utilizes a single reaction vessel and the process is carried out with continuous inflow and intermittent aeration and decanting. In contrast, the present invention is a multiple reaction vessel process in which the process variables differ substantially from the process of the subject patent.

OXIDATION DITCHES IN WASTEWATER TREATMENT, D. Barnes, C. F. Forster, D. W. M. Johnstone, Pitman Press, Bath, Avon, U.K.

"Development of the Passveer Extended Aeration System", Batty, J. A., Goronszy, M. C., Clarke, R., *The Shire and Municipal Record* (Australia), November, 1974.

"Continuous Intermittent Wastewater Systems for Municipal and Industrial Effluents", Barnes, D. and Goronszy, M. C., Oxford District Centre, Oct. 4, 1979, *Institute of Public Health Engineers*, London.

"Control of Activated Sludge Filamentous Bulking", Chudorba, J., Grau, P., Ottova, Blaha, J., Madera, V., *Water Research;* Part I, Vol. 7, pp 1163–1182; Part II, Vol. 7, pp 1389–1406; Part II, Vol. 8, pp 231–237 (1973).

"Single Vessel Activated Sludge Treatment for Small Systems", Goronszy, M. C., *Journal WPCF*, Vol. 51, pp 274–287; presented Oct. 6, 1977, 50th Annual Conference of the Water Pollution Control Federation, Philadelphia, Pa.

"The Activated Sludge Process: State of the Art", W. Wesley Eckenfelder, Jr., et al., CRC Critical Reviews in Environmental Control, Volume 15, Issue 2, 1985.

"PRINCIPLES OF WATER QUALITY MANAGEMENT", W. Wesley Eckenfelder, Jr., CBI Publishing Company, Inc., Boston (1980).

The foregoing publications describe the basic theory and operation of the activated sludge process and the extended aeration process for treatment of sewage.

BRIEF DESCRIPTION OF THE DRAWINGS

In the graphs of the figures and in the description, typical or average valves are used. Many data are specific to a particular sludge, etc., and the actual valves may vary greatly from the data presented which exemplify phenomena not valves per se.

FIG. 11 schematically depicts an alternative embodiment of Zone B of the system of FIG. 7 wherein up to ninety-five percent of the space below the Bottom Water Level (BWL) is occupied by a fixed film growth media which may be fixed, mobile or in the form of mobile particles.

FIG. 13 schematically depicts the operation during cyclic periods of time of the system of FIG. 12.

FIG. 15 graphically depicts the removal of biological phosphorus with time, using the present invention. The vertical axis indicates percent or ratio of phosphorus removed, increasing upwardly, and the horizontal axis indicates time, increasing to the right.

SUMMARY OF THE INVENTION

The invention relates generally to improvements in the treatment of municipal sewage and/or industrial wastewater using dispersed growth and/or attached growth biomass. The invention enables a high quality effluent to be generated whereby substantial biological denitrification and phosphorus removal is consistently achieved and provides a process which is more cost and energy effective for the treatment of domestic and industrial wastewaters.

This invention provides a method for achieving a minimum of two successive stages of biomass absorption in a reaction vessel whereby conditions which favor sludge bulking are avoided. It is therefore possible to use the same reaction vessel to carry out the solid-liquid separation function to thereby produce a treated effluent which is removed by a surface liquid removal device. This invention ensures that biomass absorption mechanisms are maximized.

the reaction vessel is operated with repeated sequences of aeration and non-aeration which, combined with the maximization of biomass absorption mechanisms in a series arrangement, provides a method of wastewater treatment that is superior to existing conventional, intermittent activated sludge and sequencing batch reactor methodology.

By proper manipulation of floc-load, mean cell residence time and cyclic aeration periods, it is possible to provide a method of treatment such that biological degradation processes of carbonaceous oxidation, nitrogenous oxidation, substantial biological denitrification and phosphorus removal, together with good biomass liquid separation can be accomplished in a common variable volume reactor, being one embodiment of the invention. The common variable volume reactor in its preferred form is subcompartmentalized in at least two hydraulically distinct sections in concurrent liquid flow communication to permit certain floc-loading conditions to be generated in each section. The number and configuration of subcompartments, formed as separated vessels or by the use of sectioned walls is primarily determined by the magnitude of the average daily flow and the duration of peak continuous flows together with the total and soluble BOD (or other) fraction associated with the hydraulic load. A basic feature of this invention is to provide sequenced and/or staged absorption in a configuration which maximizes the removal of pollutants in a manner that also permits the use of a variable volume reactor. A further basic feature of this invention is the ability to use the variable volume reactor for both biological degradation and solids-liquid separation functions. A minimum of two stages of absorption are required in this invention in the case of domestic wastewaters. For higher strength readily degradable wastewaters additional stages of absorption are provided, the number depending on the ratio of soluble to total BOD (or other parameter).

Figure 1:
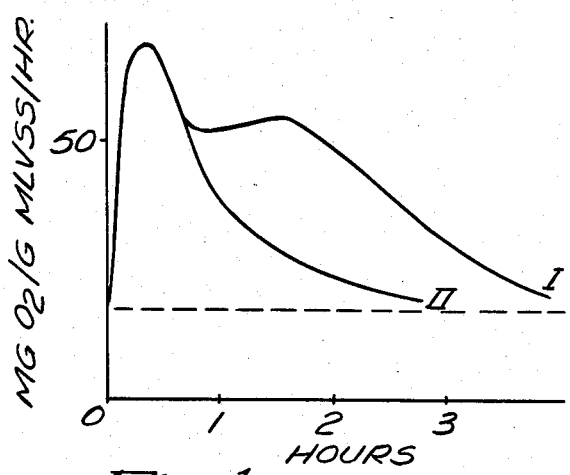
FIG. 1 graphically depicts a typical bioresponse profile during and following absorption. Curve I shows the results of aeration of the biomass in the presence of residual unabsorbed substrate. Curve II shows the results of aeration in the absence of unabsorbed substrate. The vertical axis indicates Specific Oxygen Uptake Rate, increasing upwardly, and the horizontal axis indicates time, increasing to the right. SOUR typically exhibit maximum valves of up to 200 mg $O_2$/g MLVSS/hr.
Figure 2:
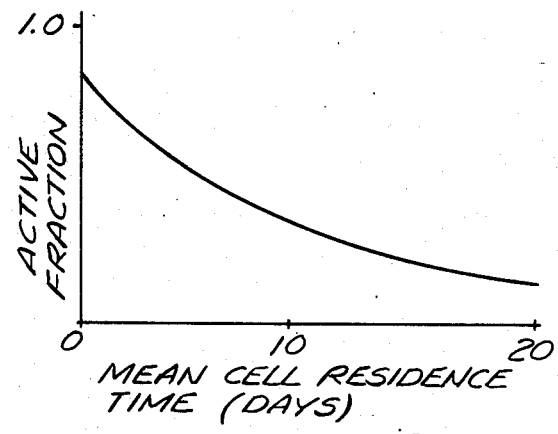
FIG. 2 graphically depicts the decrease in active fraction, i.e. degradable content of the biomass, with the mean time the biomass resides in the system, of a typical system. The vertical axis indicates the Active Fraction, increasing upwardly, and the horizontal axis indicates time, increasing to the right. At 13 days Mean Cell Residual Time (MCRT), the degradable fraction is typically 0.66.
Figure 3:
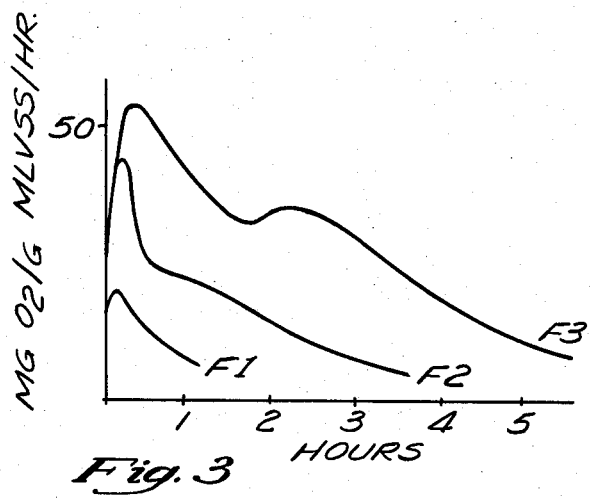
FIG. 3 graphically depicts the change in floc loading (F) with time for three different initial floc loads, as measured by Specific Oxygen Uptake Rate in a typical system. The vertical axis indicates Specific Oxygen Uptake Rate, increasing upwardly, and the horizontal axis indicates time, increasing to the right, $F1 < F2 < F3$.
Figure 4:
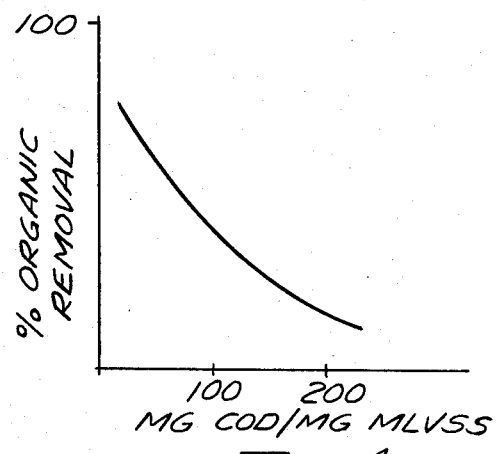
FIG. 4 graphically depicts a typical reduction in substrate concentration, measured as percent of organic content removed, with increasing floc load. The vertical axis indicates Percent Organic Compound Removed increasing upwardly, and the horizontal axis indicates floc load, increasing to the right.
Figure 5:
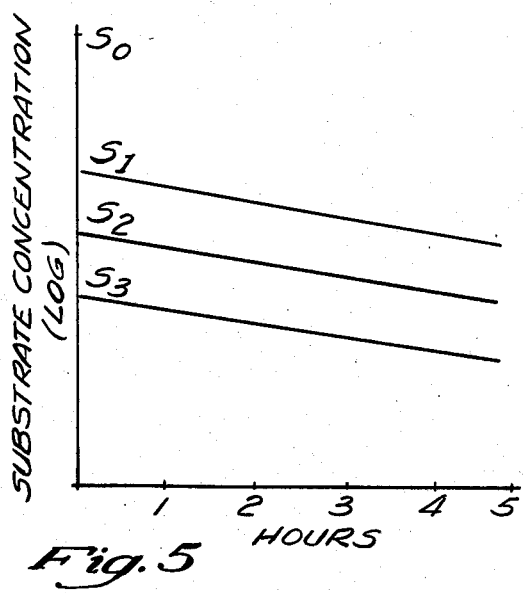
FIG. 5 graphically depicts the reduction in substrate concentration for various initial substrate concentrations with time. The vertical axis indicates the logrithm of the Substrate concentration, increasing logrithmically downwardly, and the horizontal axis indicates time, increasing to the right.
Figure 6:
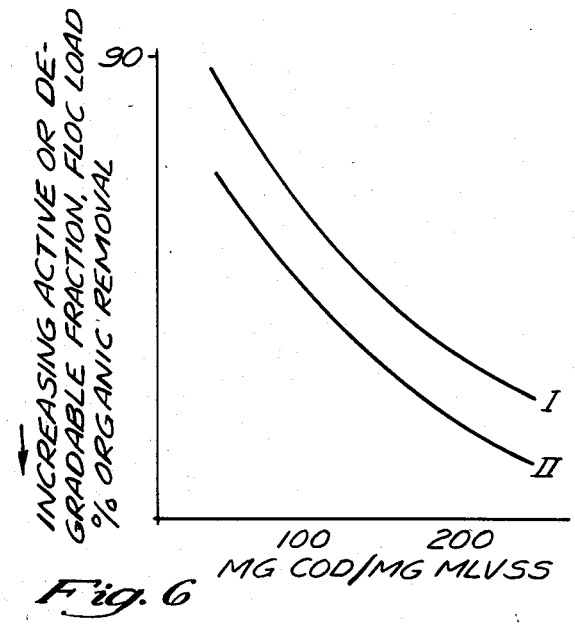
FIG. 6 graphically relates the amount of organic substrate removed with increasing floc load for aerobic conditions, Curve I, and anaerobic conditions, Curve II for the same active fraction of biomass.
Figure 7:
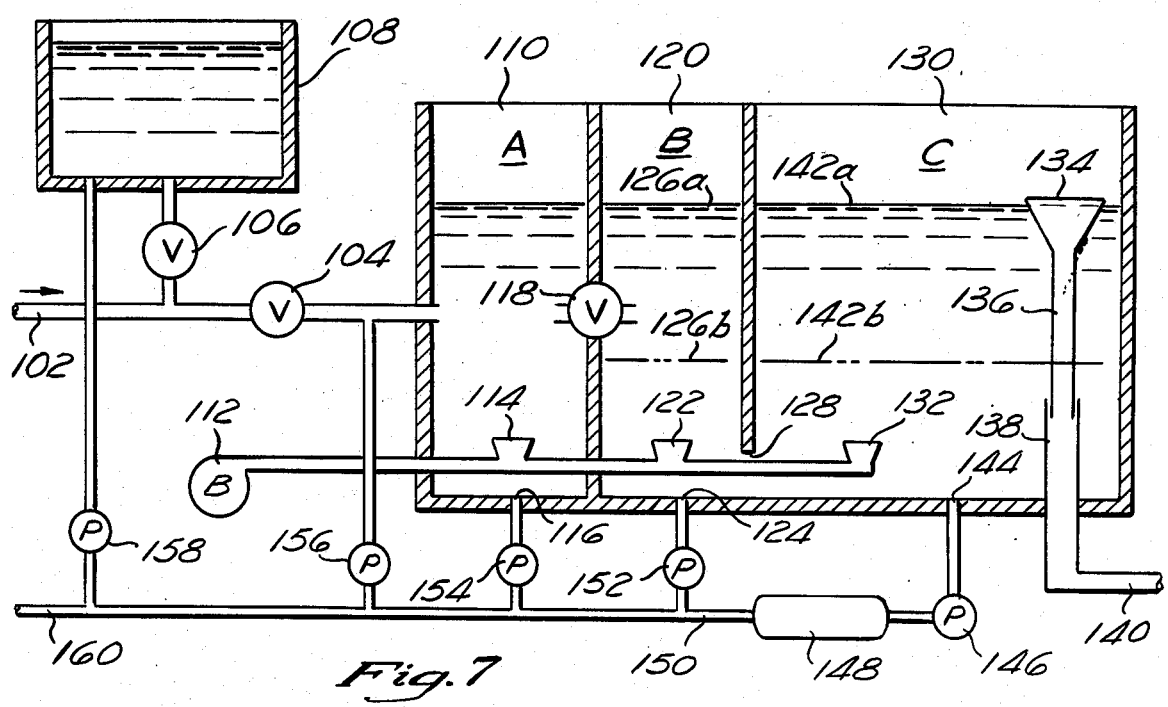
FIG. 7 is a partially schematic depiction of a basic apparatus in which the process of this invention may be carried out. The presentation of structure, however, is without particular significance since the process may be carried out in virtually any structure which provides the reaction zones of the present process.

A simple embodiment of two stage absorption is shown schematically in FIG. 7.

Referring to FIG. 7, the process of the invention proceeds as follows: Wastewater to be treated enters into a first reaction zone A which is defined in a first vessel 110 and, as will be described, flows intermittently into a second reaction zone B, in a second vessel 120 and, through the second reaction zone, into a third reaction zone C in a third vessel 130. The first of influent zone A serves as the initial contact of the influent wastewater with activated sludge. The organic biological load of the wastewater, which is typically reported as Biochemical Oxygen Demand and/or Chemical Oxygen Demand, is at its maximum upon entry and decreases very rapidly in the first reaction zone A, as depicted in portion A of the graph of FIG. 10, will vary periodically as the associated flow is periodically held and then dumped into the succeeding reaction zone B before passing into C. It will be understood that the configuration of the first reaction zone is not, per se, critical. This zone may be confined in a vessel as indicated in FIG. 7, which may be a compartment, defining a separate vessel, in a larger structure or a separate tank entirely. The zone may even be a high capacity inlet conduit system 100.

After a residence period, generally not exceeding five minutes, the wastewater flows into the second reaction zone B. Schematically, a valve mechanism 107 is shown which periodically opens and closes to direct total inflow into another small vessel during the effluent decantation sequence. During the aeration sequence this stored influent is directed to zone B by a valving or pumping arrangement to mix with additional flow from zone A. The stored effluent may be dumped directly into zone B or, as shown, flow through zone A to zone B. A valve, gate, movable weir, or any other means for periodically permitting and preventing flow from the first zone A to the second zone B may be used. Additional activated sludge, if needed, may be mixed with the wastewater in the second reaction zone B and the mixture is aerated. There is a very high BOD reduction in the second reaction zone B as indicated in the portion of the graph marked "B" of FIG. 10.

The second reaction zone B is in fluid communication with the third reaction zone C. FIG. 7 shows a single multiple-vessel tank structure, and there are certain economies in this kind of structure, in that one need not construct as many hydraulic bearing walls as would be necessary using separate tanks. This principle, multiple vessel tanks, has been used for decades if not centuries in sewage treatment facilities. In terms of operation, however, each compartment may be treated as a separate tank, with continuous flow communication.

Figure 10:
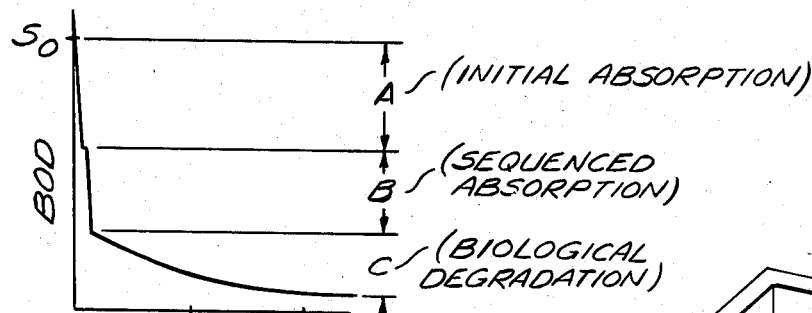
FIG. 10 graphically depicts, in somewhat idealized curves, the loading reduction profile in the process of the invention as carried out in a two-stage, three zone system as depicted in FIG. 7. The vertical axis indicates Biological Load of the wastewater undergoing treatment in the three zones, A, B and C, increasing upwardly, and the horizontal axis indicates time increasing to the right. Process changes A and B in FIG. 10 typically take place in from about 5 to 20 minutes respectively.
Figure 9:
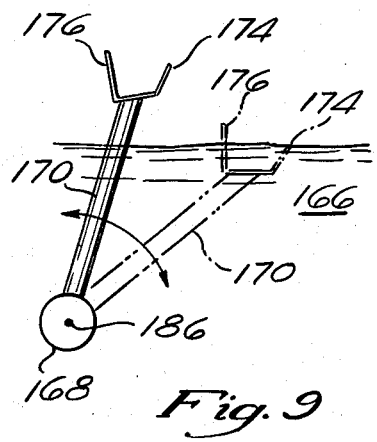
FIG. 9 is a side view of the weir showing its orientation at two positions, the second position being shown in phantom line, the inflow to the weir at all times being on the same leading edge side of the weir.
Figure 8:
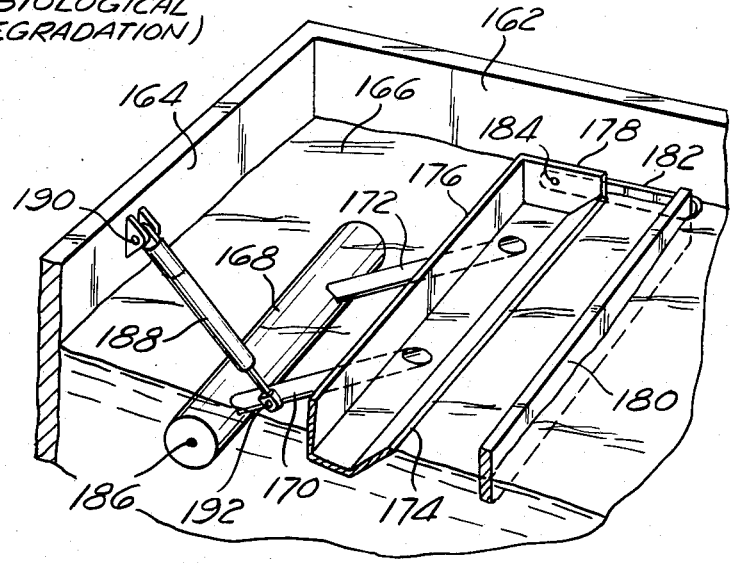
FIG. 8 is a cut away perspective of a portion of a weir of the type which may be used in this invention, showing portions in cross-section. This weir is the joint invention of the inventor of the present invention with Olavarria and Piccioli.

As shown in the portion of the graph marked C in FIG. 10, the rate of BOD reduction in the third reaction zone C is very much lower than in the first and second reaction zones A and B. Of course, the active biological load of the wastewater entering the third reaction zone C is much lower than that entering the preceeding zones. The wastewater in the third reaction zone C will have developed a very high activated sludge content and the principle functions of the third reaction zone C are two-fold: first to complete the oxidation of the biochemical oxygen load of the wastewater and, second, to permit the sludge to settle leaving a clear upper layer which forms the effluent from the process and system of the invention. This effluent is removed through any convenient decanting device. An exemplary type of weir is shown in FIGS. 8 and 9. Scum guards, etc. are typically provided to prevent floating debris, etc., from being decanted. The decanting apparatus is not, per se, part of this invention, however, and any suitable decanting apparatus may be used. The decanted effluent exits the system as ecologically acceptable water which may be reprocessed, used for irrigation or simply disposed of.

Activated sludge is removed from the third reaction zone C and may be introduced into the second reaction zone B. Likewise, activated sludge may be introduced into the first reaction zone A. Similarly, if desired, the activated sludge may be mixed with the influent wastewater even before the wastewater actually enters the holding portion of the first reaction zone A, and may also be introduced into a holding tank. Surplus activated sludge is removed and treated in the conventional manner.

A blower or air pump forces air, or oxygen containing gas into the second reaction zone. Likewise, air may flow in the third reaction zone C.

The time sequence of the process during normal, average dry weather operation, is as follows: Influent wastewater is continuously received into the first rection vessel A where it is mixed, either in the vessel or before, with activated sludge. If there is excess inflow, it is held in the holding tank. During a first period of time, the BOD reduced wastewater flows into the second reaction zone B and then into the third reaction zone C where, during a second time period, it is subjected to aeration and may, in zone B, have additional activated sludge added. During a third time period, the outflow from zone A is stopped. During this third time period, effluent from the system is decanted from zone C thus lowering the water level in zones B and C. The level of water in zones B and C will periodically raise from the Bottom Water Level (BWL) to the Top Water Level (TWL), as shown in FIG. 7.

With specific reference to FIG. 7 and the apparatus shown therein schematically, it will be understood that the invention resides principally in the process and that any apparatus which provides the necessary reaction zones and conditions may be used to carry out the invention. As depicted in FIG. 7, the inflow of wastewater from sewerage line 102 may pass through a valve 104, or equivalent stop-flow mechanism, into vessel 110, zone A, or through a valving mechanism 106 into a holding tank 108. The holding tank is not necessary to operation during Average Dry Weather (ADW) operation if the size of vessel 110 is adequate; however, during periods of abnormally high input extra holding capacity may be required. The holding tank per se is not an essential feature of the invention, although it may, in effect, serve as an extension of zone A if desired. Aeration is provided into vessel 110, zone A, from a blower 112 and nozzle 114 which forces air or oxygen into zone A from inlete 116. A valving mechanism, gate or other stop-flow mechanism or arrangement 118 permits the aerated effluent from zone A to flow into zone B, vessel 120.

The contents of zone B, in vessel 120, are aerated from blower 112 and nozzle 122 and sludge may selectively be introduced into zone B from sludge inlet 124. The level of wastewater being treated in zone B varies, as described, from a TWL 126a to a BWL 126b as the contents of vessel 120 flow through any desired type of fluid communication 128 into zone C. The fluid communication 128 may be passageways in a weir, a conduit, a gate, or any other form of fluid communication. In a preferred embodiment the communication is such that sludge may flow in two directions to and from zone B to zone C. If this sludge flow is adequate, it may not be necessary to add additional sludge via the conduit port 124.

Zone C, in vessel 130, serves as a aeration, settling and decanting zone. Aeration is provided by a nozzle 132 and decantation is provided by a weir 134 which, in the embodiment schematically shown in FIG. 7, is attached to a telescoping conduit system 136 and 138 is drivin by any desired means up and down to decant the wastewater into the outflow line 140, which is connected to the ultimate disposal or reprocessing system, between a TWL 142a and a BWL 142b, as described before.

The aeration is controlled to re-activate the sludge which is then removed through conduit 144 and any suitable mechanism and recycled and/or disposed as required. An exemplary mechanism for this purpose includes a pump 146, sludge holding tank 148, conduit 150 and pumps 152, 154, 156 and 158 which, selectively as desired, introduces activated sludge into zone B, zone A, the sewerage inlet line 102 to zone A and, if desired, into the holding tank 108. Excess sludge is disposed of via sludge exit line 160.

The decanting assembly which is depicted in FIGS. 8 and 9 may be, but is not necessarily, used with the present invention. The decanting assembly is the joint invention of the present invention with others and is shown here merely to exemplify the type of decanting means which may be used. The decanting arrangement is shown in a wastewater treatment tank which includes a sidewall 162 and an endwall 164 and contains a body of wastewater 166. The decanting assembly comprises a removal conduit 168 mounted for rotation to which one or more downcomer pipes 170 and 172 are connected in fluid communication therewith. A weir comprising structure forming a leading edge 174 and a trailing edge 176 and end structure 178 form a weir which is in fluid communication with the downcomers 170 and 172 to permit the liquid which flows over the leading edge 174 to flow through the downcomers and out the removal conduit 168. A scum guard 180, means of an arm 182 to the end of the tank as shown at 184 such that at all orientations of the weir the plank will lie substantially in the vertical plane and, thus, prevent floating debris from entering the decanting apparatus. The decanting assembly is moved pivotally about a pivot point 186 positively up and down by any desired moving means, a hydraulic or air actuated ram 188, connected to the wall at 190 and the downcomer pipe 170 as shown at 192, being shown as merely exemplary.

FIG. 9 shows the positioning of weir during operation. The solid line position of the weir shows the weir as it would be oriented at or near the TWL. The phantom view shows the weir at or near BWL. Two features of this decanting mechanism are pointed out here. First, the weir is always under positive drive control, the scum guard providing no bouyant support at all. Second, the inflow into the weir is always over the leading edge 174.

It will be understood that this is merely one of any number of decanting mechanisms which may be used.

Thus, flow is accepted continuously at A. Biomass is continuously (or intermittently) directed from C (the main aeration section) to mix with untreated wastes at a point A before entering the reactor system. At A mixing is caused whereby absorption mechanisms take place with the biomass. A may be a length of influent line with or without an in-line mixing device, or a separate reactor volume with or without a mixing device and with or without aeration. The mean contact time at this point is up to 5 minutes whereby substantial initial absorptive removal of soluble BOD (or other parameter) takes place. The flow of biomass from C is only minimal when compared to conventional technology, being up to 20 percent, by volume, of the inflow to the system. In most applications the flow is only 5 to 10 percent. This may be compared to conventional systems where the flow from the separate clarifier returned to the aeration vessel is of the order of or in excess of 100 percent. The combined flow at A passes to a subsection B for admixture with additional biomass. In a preferred embodiment of the invention biomass transfers from C to B as a result of backmixing and diffusion; in the absence of sufficient backmixing, additional biomass may be pumped. From B the flow passes into C. Flow and floc-loading for the schematic systems shown in FIG. 7 is designed to effect a loading reduction profile schematically shown in FIG. 8.

From FIG. 8, it will be seen that the biological load, whether measured by biochemical oxygen demand, chemical oxygen demand, or otherwise, decreases very rapidly with time in Zone A and also decreases rapidly in Zone B, most of the oxygen consuming biological material having been transferred from the soluble state, the BOD decreases at a lower rate in Zone C which effects settling, decantation and restores the absorptive potential of the biomass.

A further embodiment of the invention, as depicted schematically in FIG. 11, places fixed-film growth media into compartment B to provide an additional or alternative means of ensuring an available biomass for sequential absorption. The placement of such fixed-film growth media in conjunction with biomass (in suspended form) transfer from C provides another equivalent stage of absorption and is hence a simple method for increasing the biological absorptive load capacity of the first system. Subsequent compartments both with and without fixed-film growth media are contemplated, depending on the strength of initial wastewaters and the quality of effluent that is desired. The media may be stationary or of the moveable type, devices such as described in PRINCIPLES OF WATER QUALITY MANAGEMENT, is preferrably placed such that it is submerged below the designated bottom water level position. Moveable fixed-film growth media so operates during aeration sequences as to assist with mixing the biomass and aid in sludge transfer from Zone C.

The volume and specific area of the fixed-film growth media is determined by wastewater strength considerations and may occupy a volume percentage of up to 95 percent of the bottom water volume of compartment B (or subsequent compartments). The fixed-film growth media may have a surface to volume ration of up to 400 square feet per cubic foot of media.

The preferred embodiment of this invention operates with sequential periods of aeration and non-aeration. During the non-aeration portion of the sequence, dispersed solids in compartments B and C (for the example shown schematically in FIG. 7) are caused to settle and after a requisite time clear surface liquid is removed from compartment C by a moveable weir device. When the liquid level shown as bottom water level is reached the moveable weir returns to its resting position at a level in the reactor which is above the designated operating top water level of the reactor. The effluent removal operation may also be achieved by other devices, such as valves or other moveable decanters. It is specific to this embodiment of the invention that the reactor operates with variable volume between a designated top and bottom water level.

In order to discount any possibility of hydraulic short-circuiting or disruption of settled biomass during surface liquid removal, inflow to B and subsequently to C (in the embodiment shown in FIG. 7) is shut off. In this one tank embodiment the flow from A is collected in a very small vessel or sub-compartment during the effluent removal portion of the sequence. This volume of biomass and influent wastewater is directed into compartment B on completion of effluent removal and reinitiation of the aeration sequence. This inflow fraction is only interrupted during effluent removal. This flow interruption is beneficial as it permits a higher rate of surface liquid removal and obviates any possible form of short-circuiting from influent to effluent ends of the variable volume reactor during surface liquid removal.

Another embodiment of the invention, termed the two tank system, is schematically depicted in FIG. 10. The invention is not restricted to the geometrical shapes shown, and can be applied in any number of multiple tank arrangements. In this embodiment, the general operation described with reference to FIG. 7 is also used. There is no fixed-film growth media shown, but fixed-film growth media may likewise be used.

Figure 12:
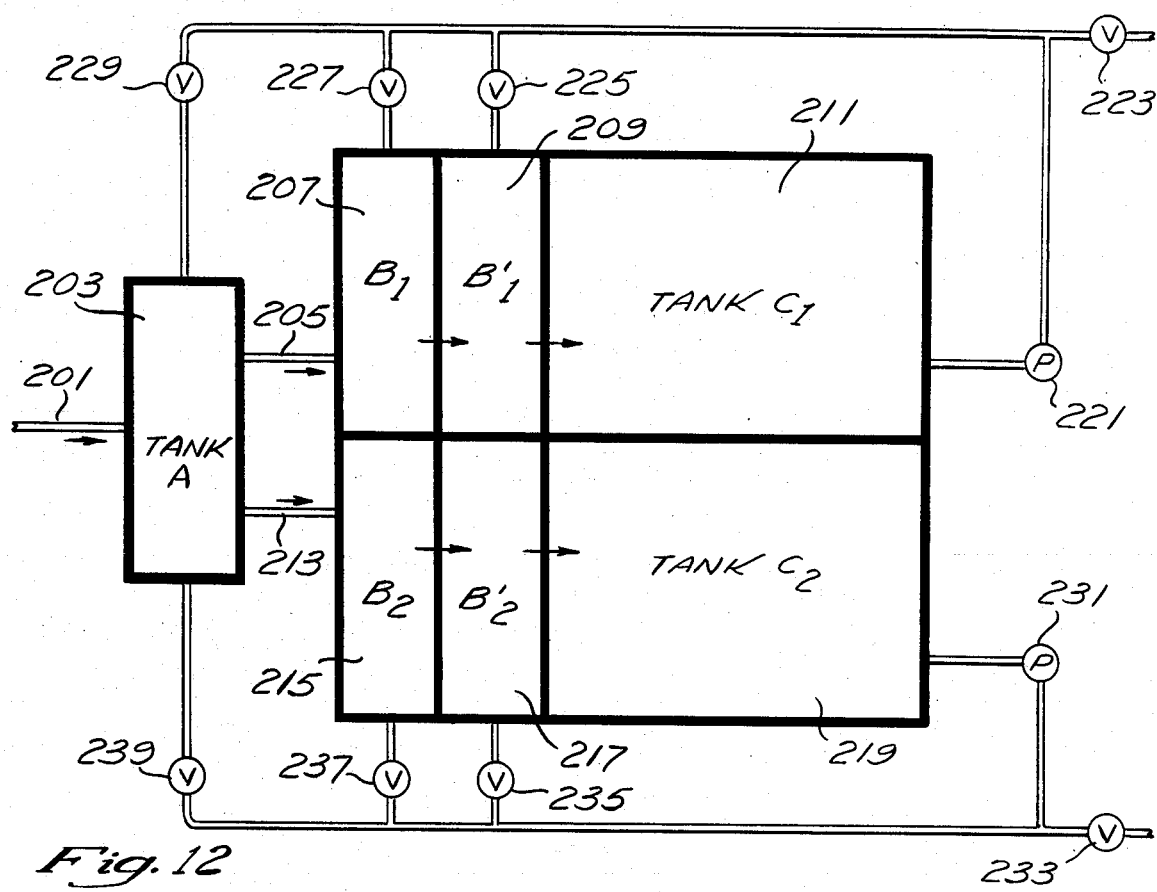
FIG. 12 schematically depicts an alternative embodiment of the invention comprising two digestion zone defining tank systems which may operate alternate from an inlet zone.

Referring now to FIG. 12, it will be understood that the unit operations described for the single reactor embodiment of FIG. 7 are the same. In flow of untreated waste water from conduit 201 enters tank A. During one period of time, the flow is from tank A, which defines a wastewater influent zone A, indicated at numeral 203, through a conduit 205, into a tank 207, which defines a first stage $B'_1$ of a first reaction zone B. The second phase of zone $B_1$ vessel 209, $B'_1$, is shown only to indicate that subsequent absorption reaction zones or sub-zones, may be so provided. Multiple staged absorption zones would not normally be required for municipal wastewater. Decantation is effected from zone C, vessel 211, in the same manner as previously described, the decanter apparatus being omitted from this drawing for clarity.

During another period of time, the flow is from the tank 203, zone A, through a conduit 213, into the first stage of a second reaction zone in tank 215, zone $B_2$. Another tank 217, reaction zone $B'_2$ may optionally be provided. Flow is then into the third reaction zone C, tank 219. As previously described, decantation from zone C, vessel 219, is periodically effected.

Sludge pumped from tank 211 by a pump 221 and may be discharged through a valve 223 or returned through a valve 225 to the tank 209 or valve 227 to the tank 207, or to both tanks, and may also be introduced through a valve 229, into a tank 203. In a similar manner, the sludge pump 231 may pump sludge which may be removed from the system through a valve 233 or returned through valve 235 to tank 217 or valve 237 to tank 215 or valve 239 to tank 203.

The mode of operation of this kind of system is the same, functionally, as that described previously; however, this system has a higher capacity because it has a duplicate series of reaction zones which are periodically operated. In flow is continuous from conduit 201 into tank A. During one period of time, the waste water is treated through the series of tank $B_1$ and $C_1$. During aother period of time, while tank $C_1$ is being decanted, the sewage is being treated in tanks $B_2$ and $C_2$. Thus, it will be seen that the tanks are alternately operated to effect aeration of the waste water in one series of tanks while the other is being decanted, then the position is reversed and the other series of tanks is aerating the sewage while the first series is being decanted.

Typical floc-loading patterns for assumed ideal steady-state flow conditions are shown schematically in FIG. 11. Real flow conditions vary from the ideal. Floc-load criteria and volumetric sizing of reactor absorption components $B_1$ and $B_2$, etc. are selected to ensure that remaining BOD (or COD) is less than 20 percent by concentration of influent BOD prior to the flow entering compartments $C_1$ and $C_2$.

For the two-tank embodiment, aeration and non-aeration periods are sequenced so that while reactor 1 is undergoing aeration, reactor 2 is undergoing non-aeration. This effects an economy on aeration equipment which permits the use of lower horsepower aeration units by virtue of the 24 hour continuous aeration duty. Multiple vessel embodiments are similarly phased to permit the same 24 hour duty aeration to take place.

It will be understood that treatment times will vary with the parameters of the particular system. In general terms biomass concentration, relative to the designated bottom water level in the third reactor C may be up to 5,000 mg/L although values in excess of 10,000 mg/L can be maintained. The duration of contact of biomass solids from $C_1$ or $C_2$ with influent wastewater at A will generally not exceed 5 minutes, shorter times will still give the desired level of absorption. For the cited 5,000 mg/L concentration of biomass in the reactor and a flow of biomass from $C_1$ and $C_2$ of up to 20 percent of the influent wastewater flow an approximate 2 minute initial absorption time will suffice. For the same biomass concentration cited $B_1$ and $B_2$ would typically provide a retention time equal to the surface liquid removal period, calculated on the disignated bottom water level and the combined average inflow from the flow splitting device. The hydraulically distinct sections in concurrent liquid flow communication in each vessel, following the flow splitting device, simultaneously and together offer alternating periods of aeration and non-aeration. The duration of these relative periods is determined by a number of factors. In practice a minimum total aeration period would be 50 minutes followed by a minimum non-aeration period of approximately 50 minutes, after which aeration etc. is repeated. Other aeration time periods can be used, being typically 1.5 to 6 hours duration. In such cases, the non-aeration period would not normally exceed 2 hours but could be arranged to do so if process conditions so require. Under certain circumstances the aeration period may be 22 hours followed by a non-aeration period of up to 2-3 hours. Any suitable combination of these periods may be used.

The bacterial sludge (biomass) after passing through the absorption units will contain the absorbed but essentially unmetabolized organic material. This biomass passes into the final compartment where its absorption potential is restored by virtue of the aeration and metabolic reactions. Compartment C therefore provides a pool from which to take the requisite amount of biomass to ensure the reductions in organic content previously described. Before entering Compartment C the liquid phase will have a greatly reduced content of BOD amounting to at most only 20 percent, by concentration, of the influent value. By example a domestic wastewater having an enfluent strength of 300 mg/L BOD and suspended solids would after two successive stages of absorption as described before have a BOD of less than 60 mg/L in the liquid phase as it passes into the final compartment C, at average flow conditions. Correspondingly an influent strength of 150 mg/L BOD would be reduced to less than 30 mg/L BOD in the liquid phase. Higher strength industrial wastewater would similarly have the BOD reduced, the number of absorption stages being sized to ensure the 20 percent criteria previously described. Residual organics (measured as BOD or other parameter) are degraded by the biomass in Compartment C.

FIG. 13 depicts the operation of a system such as shown in FIG. 7, with normalize times and assuming ADW operation. It should be recognized that during sub-periods of high wastewater inflow, such as might occur, for example during rain storm, or during periods of low wastewater inflow such as might occur during a period drought, holiday periods, etc. The time cycles may vary and, indeed, a cycle may be abbreviated or omitted or extended depending upon the flow rate at a given time. Overall, however, the time periods of FIG. 13 may be considered typical of a mode of operation of the invention.

At a top of FIG. 13, one complete cycle is shown. During the period $T_0-T_1$, which may be an hour plus or minus a half-hour generally, Zone A is receiving inflow, zone $B_1$ is receiving inflow and zone C is receiving inflow. During this period, $T_0-T_1$, zone $B_2$ is settling and may be receiving inflow. During the time period, $T_1-T_2$, zone A continues to receive inflow, zone $B_1$ and zone $C_1$ receive inlfow and $B_2$ and $C_2$ are being decanted and there is no inflow from zone A to these zones. During the period $T_2-T_3$, A continues to receive inlfow, $B_1$ and $C_1$ are settling, B, continues to receive inflow $B_2$ and $C_2$ are being aerated and receive inflow from zone A. During the period $T_3-T_4$, A continues to receive inflow, $B_1$ and $C_1$ are being decanted and receive no inflow from A, and $B_2$ and $C_2$ are being aerated and receive inflow from A.

It will be seen that, as to each flow stream, there are three time periods. During the first itme period, B and C are being aerated either during all or some of the period, and B and C receive inflow from A. During the second period of time, B and C are settling and would receive inflow from A. During the third period of time, B and C are being decanted and there is no inflow from A. By overlapping the three time periods for the flow streams 1 and 2, continuous inflow to A is accomodated with intermittent and alternatingly sequenced flow to path 1 and path 2, i.e. $B_1-C_1$ and $B_2-C_2$. The floc load in the zones are depicted qualitatively in the graphs of FIG. 13, increasing upwardly on the abscissa and to the right on the ordinate, the time periods being about one hour plus or minus a half or three-quarters of an hour each, as may be required in a given installation. Each flow path cycles full in a time period of from about two to about five hours, a four hour period being used in FIG. 13 merely to depict the sequencing and not the time per se of the steps of the process. Equal intervals of time are indicated in FIG. 13 but would not necessarily be used. The decant time may be from about one-half hour more or less to one and one-half hours more or less. The settling time may be generally equal to or longer than the decanting time. The settling time could be shorter also, but this would not be a usual or common case. Aeration time would be from about one to three times the time length of the combined settling and decanting time, though the ratio is optimized at one to one. The time-determining criteria are set forth elsewhere herein in terms of the oeration of the process and the sludge quality requirements, FIG. 13 being provided to show sequencing rather than to define specific times.

Figure 14:
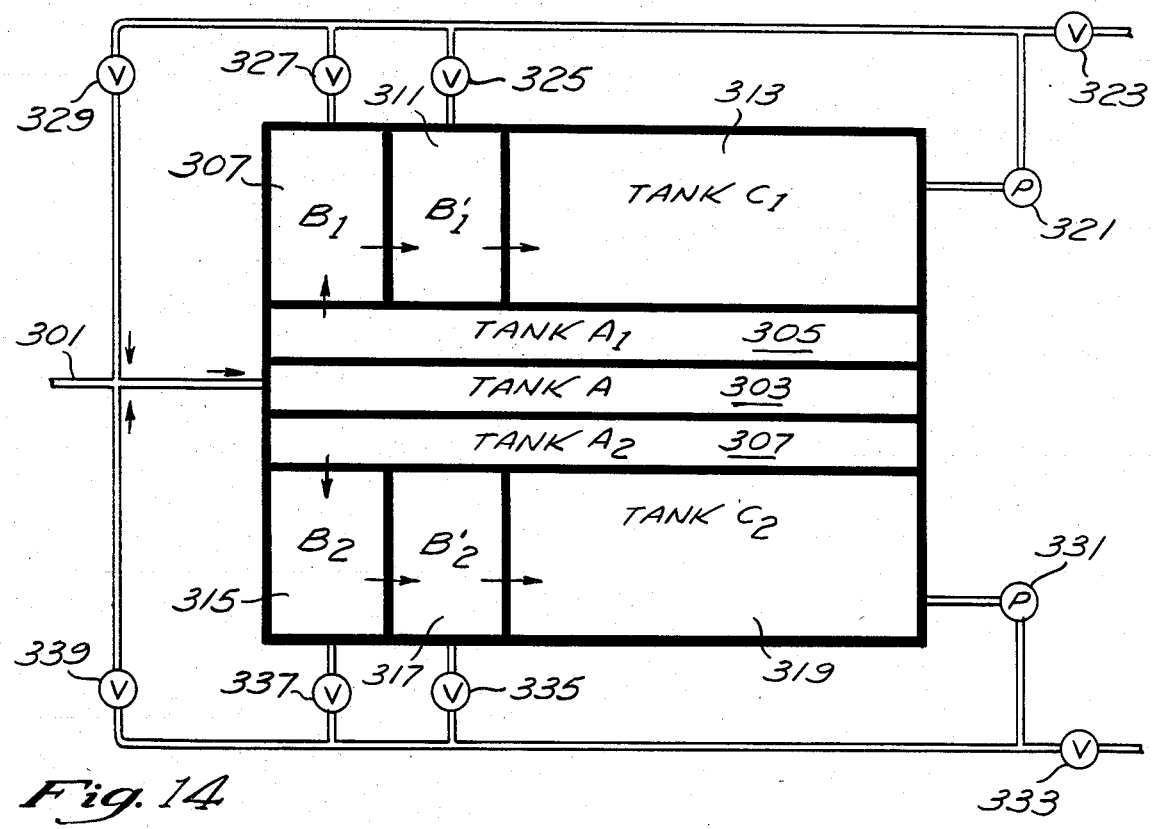
FIG. 14 schematically depicts yet another embodiment of the invention in which the inlet zone is subdivided into separate zones.

Another embodiment of the invention provides for absorptive and subsequent reactive degradation to take place in a plug-flow configured, cyclically aerated water retaining structure, from which the flow is split for direction to either one of two sequentially aerated water retaining structures schematically shown in FIG. 14.

Referring now to FIG. 14, the influent waste water enters through the conduit 301 and to tank 303, reaction zone A. Reaction zone A is actually divided into sub-zones, shown as tank A, tank $A_1$, and tank $A_2$, indicated by numerals 303, 305 and 307. The flow is divided between tank $A_1$, and tank $A_2$. From tank $A_1$, 305, the flow is through a conduit into the first stage of second reaction zone in tank 307, zone $B_1$, and then into the second stage of the second reaction zone in tank 311, zone $B_1$ prime and then into tank 213, the third reaction zone $C_1$ in like manner, the flow, during a different period of time, is through a conduit into tank 315 and into tank 317, which defined, respectively, reaction zones $B_2$ and $B'_2$, and then into tank 319 which defines the third reaction zone $C_2$. As pointed out before, the sub-zones or phases within a zone, e.g. $B'_1$ and $B'_2$ (311 and 317) are shown only to make the point that subsequent absorption zones may or may not be used as required. It is important to recognize that the number of zones will be determined to the influent into the zone. The influent raw waste will control whether more than one zone is require. High carbohydrate content, e.g. potato processing water, would require more sub-zones or phases than municipal wastewater, for example. The sludge handling is the same as previously described. Specifically, the sludge pump 321 pumps the sludge which may be removed through the system through valve 323 or returned to the second reaction zone through either or both of valves 325 and 327 and to the first reaction zone indicated in this particular embodiment as being introduced into the in flow conduit through a valve 329. The sludge pump 331 with the associated valves 333, 335, 337 and 339 function in the same manner with respect to the second series of tanks.

Water retaining structure A, $A_2$, $A_3$ is a high rate absorptive/degradation reactor with partial segregation walls extending from the floor of the vessel to a height exceeding the designated top water level of that vessel.

Unit operations described for the single reactor embodiment and the two tank system embodiment are essentially the same.

Flow of influent wastewater to $A_1$ and $A_2$ is continuous, on an as received basis, through the initial mixing zone A. Flow from sludge pumps to A is also continuous. Biomass from $C_1$ and $C_2$ can either be totally direct to A, and partially directed to $B_1$ and $B_2$. For short periods, sludge is also wasted from the system.

Wasting from a reactor vessel takes place either in the aeration of non-aeration periods, but is preferred during non-aeration as a more concentrated biomass is generated resulting in more cost effective sludge management.

Flow from A to $A_1$ and $A_2$ is directed to permit flow division to either of two water retaining reactors, $B_1+C_1$ or $B_2+C_2$. While surface liquor is being removed from $C_1$ the total flow from $A+A_1A_2$ is directed to $B_2$ etc; while surface liquor is being removed from $C_2$, the total flow from $A+A_1+A_2$ is directed to $B_1$ etc, This two tank embodiment, with high rate initial plug-flow continuously aerated reactor provides the advantage that uninterrupted flows are accepted by the system and that reduced overall reactor volumes are required which has significant capital cost benefit.

This embodiment may also have fixed-film growth media in $B_1$ and $B_2$, and subsequent absorptive reactor sections. This embodiment also operates with aeration and non-aeration sequencing such that while reactor 1 is undergoing aeration, reactor 2 is undergoing non-aeration. During the decant sequence of reactor 1, total flow from $A+A_1+A_2$ is directed to reactor 2; and while reactor 2 is in the decant sequence, total flow from $A+A_1+A_2$ is directed to reactor 1.

By the use of these concepts, vessel sizes can be reduced with the result that high quality effluents having been biologically denitrified can be produced at overall average hydraulic retention times as low as 9 hours (for domestic wastewaters) as opposed to hydraulic retention times previously accepted by the industry of about 24 hours or more; hydraulic retention relating to daily average day weather flow. Compartment C serves as the metabolism and absorptive capacity regenerator reactor for organics which are removed in the absorption stages. Where attached growth absorption takes place, subsequent metabolism of removed organics takes place in situ. Attached growth solids are eventually displaced from the media due to aging and selective sloughing and flow contiguously with other dispersed growth solids. The proportion of displaced attached growth solids in the total is a very small proportion at any one time being only about some 10 percent.

During the non-aeration period before effluent removal, absorption mechanisms take place in the first stage as before. Second stage absorption takes place in Compartment B with biomass that is contained therein. This compartment is sized to also ensure that leakage of the influent liquid phase to, and subsequent increase in the concentration of soluble organics in, final Compartment C is minimal during the non-aeration period before effluent removal. As stated flow to B is shut off during surface liquid removal.

The repeated cycles of aeration followed by non-aeration expose the biomass to alternating periods whereby oxygen is present and absent. During the initial and subsequent period of the aeration sequence there are miriads of micro regions of depleted oxygen present in the bulk of the biomass. Such absence of near absence of molecular oxygen results in substantial biological denitrification, which takes place concurrently with the biological nitrification reactions and also during the non-aeration period. With a minimum of 2 stages of absorption, it is possible to operate this form of cyclic activated sludge system at mean bulk dissolved oxygen concentrations such that the oxygen demand rate is just exceeded by the oxygen input rate. This has not been possible with conventional activated sludge methodology because of the generation of poor settling biomass. A feature of this invention is its ability to permit such operations. Operation during the initial period of aeration does not normally show more than about 0.2–0.7 mg/L of dissolved oxygen in bulk liquid phase. During the final 25 percent of the aeration period the dissolved oxygen concentrations of around 2 mg/L exist. Sizing and aeration is such that dissolved oxygen concentrations of 2 mg/L exist for approximately 25–33 percent of the total aeration time per day. The growth of non-flocculating organisms that are selected by growth conditions at continuous low dissolved oxygen concentrations is hence negated. In this way, conditions are also generated which promote essentially simultaneous biological nitrification-denitrification reactions and enhanced biological phosphorus removal in this one sludge system. During the non-aeration sequence conditions for anaerobiosis are rapidly achieved within the sludge blanket in which the oxidation reduction potential is negative and which approaches −150 millivolts.

Nitrate nitrogen is totally removed within the sludge during the non-aeration sequence. Vessel sizing and aeration sequencing is such that bulk nitrate nitrogen, during the aeration sequence is variable to a concentration less than 2 mg/L. Because of the oxygen demand conditions which exist nitrate nitrogen concentration within microzones of the biological floc are reduced to less than 0.3 mg/L. In the 1 tank system, holding of the mixed influent (anoxic biomass and sewage) for the duration of the decant sequence results in additive anaerobiosis of that fraction. In the two tank system, direction of the total mixed influent flow (anoxic biomass and sewage) to one vessel, during the decant period of the other vessel, promotes additive macro anaerobiosis conditions in that portion of flow and particularly in the second and subsequent absorption stages. It has been found that percentage biological phosphorus removal mainly varies with the magnitude of the duration of the non-aeration sequence, particularly when aeration and non-aeration sequences are equal or approximately so. Typical biological phosphorus removal for the two stage absorption configuration described as the preferred embodiment is shown in FIG. 15.

Enhanced biological phosphorus removal can be achieved by addition of acetic acid at appropriate concentrations up to about 30 mg/L at the first absorptive mixing state during the on-off sequences. This markedly increases the percent of biological phosphorus removal and enables the system to be operated at lower non-aeration periods. This enables smaller tank volumes to be used which has a capital cost benefit.

The systems described may also be desirable where carbonaceous oxygen demand only needs to be supplied. Activated sludge processes have not found wide acceptance for treating high-carbon wastewaters such as result from agricultural processes, e.g. fruit canning, potato processing, etc. A feature of this invention which is of potentially great importance is that the absorption may be sequenced such that the BOD of the influent into the last zone, zone C, is low and the settling qualities of the sludge are high.

To recapitulate, the invention may be regarded as a continuous inflow, intermittent flow path, sequential cycle, activated sludge waste water process for treating wastewater. The process includes continuously receiving wastewater into a first zone (A) into which activated sludge from a subsequent zone is mixed and is retained in the first zone for a period of from at least approximately two to 20 minutes, typically about five minutes or longer, sufficient to form a non-bulking sludge and absorb oxidizable dissolved compounds into the activated sludge. The wastewater, which is then undergoing treatment, from the first zone (A) is passed into a second zone (B) during at least a first aerating time period into which second zone oxygen is transferred into the wastewater. Oxygen may be transferred into the wastewater undergoing treatment by pumping air or oxygen into the body of water, spraying the water into the air, or in any other desired manner. The wastewater is passed into said second zone during a second quiescent time period during which settling of sludge is caused by maintaining a quiescent condition in said second zone. The wastewater from the second zone (B) is passed into a third zone (C) during said first and second time periods, and is characterized in that it has less than approximately twenty percent of the biochemical oxygen demand the wastewater originally contained and further characterized in that sludge associated therewith is non-bulking and has a high settling velocity. The third zone (C) is aerated during the first aerating period of time to regenerate the absorption capacity of the sludge and is settled during the second quiescent period of time. The upper portion of the wastewater from the third zone (C) is decanted during a third decanting period of time during which there is no inflow into the second zone (B) from the first zone. The steps, except the inflow into zone A which is continuous, is repeated sequentially in a cyclic manner as a cyclically aerated process, influent wastewater being retained in or before the first zone (A) or directed elsewhere therefrom during the third decanting time period.

Preferably, the second zone (B) and the third zone (C) are in free fluid communication with each other. It is also advantageous to effect aeration by injecting a stream of oxygen containing gas into a portion of the third zone (C) regenerating the activated sludge and inducing backflow of regenerated sludge from the third zone (C) to the second zone (B)

Regenerated activated sludge is returned from the third zone (C) to the first zone (A) and, either by special pumps, conduits, etc., or by free-flow through the fluid communication between the zones, to the second zone (B).

The the second zone (B) may additionally include a fixed film growth support matrix with occupies from approximately twenty to approximately 90 percent of the portion of the second zone (B) below the bottom water level. This matrix may be a rotating drum type devise as described by Eckenfelder, supra or any other device or mechanism. Free floating suspended support or fixed support may be used. It is advantageous to rotate the drum, as shown in FIG. 11, in a direction which pumps sludge from zone C to zone B. The use of the matrix for defining a fixed film growth zone on the surface thereof is particularly beneficial in the treatment of wastewater containing high soluble BOD components, e.g. wherein the total BOD is from about 250 to about 2,000 mg/L or even somewhat higher and the soluble BOD component is about 50% or more of the total BOD biological component.

The process may advantageously operate in a manner wherein the second zone (B) comprises a plurality of sub-zones, (B, B') each sub-zone absorptively transporting soluble oxygen demand of the wastewater entering such sub-zone until the wastewater flowing from the last sub-zone contains no more than twenty percent of the biochemical oxygen demand of the original influent wastewater into the process.

The wherein the optimum hydraulic retention time at mean flow conditions and the designated bottm water level in the second zone (B) is substantially equal to the second quiescent time.

Acetic acid may be added to the second zone for thereby improving the phosphorus removal characteristics of the process.

The process is highly advantageous for treating municipal wastewater to reduce biochemical oxygen demand and remove ammonia, nitrate nitrogen and phosphorus. The most efficient operation is normally obtained when the floc load of the influent into the first zone is less than approximately 250 mg chemical oxygen demand/gm MLVSS. The process involves multiple stage absorptive reaction, metabolism of the removed biochemical oxygen demand associated with sludge, regeneration of the absorptive capacity of the sludge, and settling of solids and decanting of wastewater and is most economically carried out in a single water retaining structure having partitions dividing said zones from each other.

The process is very advantageously carried out using parallel intermittent flows and includes, in this embodiment, continuously receiving wastewater into a initial absorption zone (A) into which activated sludge from a subsequent zone is mixed and retaining the wastewater in the initial absorption zone for a period of from at least approximately two to 20 minutes sufficient to from a non-bulking sludge and absorb oxidizable dissolved compounds into the activated sludge. The wastewater undergoing treatment is then passed from the initial absorption zone (A) into at least one of two or more a sequenced absorption zones ($B_1$, $B_2$) during aeration thereof and passing wastewater into the respective sequenced absorption zones during respective quiescent time periods during which settling of sludge is caused in the respective sequenced absorption zones by maintaining a quiescent condition in the sequenced absorption zones. The wastewater from one sequenced absorption zone ($B_1$) is passed into one biological degradation zone ($C_1$) and the wastewater from another sequenced absorption zone ($B_2$) is passed into another biological degradation zone ($C_2$), the wastewater passing into the biological degradation zones being characterized in that it has less than approximately twenty percent of the biochemical oxygen demand the wastewater originally contained and is further characterized in that sludge associated there with is non-bulking and has a high settling velocity, the biological degradation zones ($C_1$, $C_2$) being aerated to regenerate the absorption capacity of the sludge and being settled during respective quiescent periods. The upper portion of the wastewater is decanted from one biological degradation zone ($C_1$) during one period of time and the wastewater from the other biological degradation zone ($C_2$) is decanted during another period of time, there being no inflow from the initial absorption zone (A) into the one sequenced absorption zone ($B_1$) during the decantation of the one biological degradation zone ($C_1$). There is no inflow into the other sequenced absorption zone ($B_2$) from the initial absorption zone (A) during the dectantation of the other biological degradation zone ($C_2$). The decantation of the respective biological absorption zones ($C_1$ and $C_2$) is carried out at different time periods.

The sequenced absorption zones ($B_1$ and $B_2$) and the biological degradation zones ($C_1$ and $C_2$) respectively are preferrably in free fluid communication with each other, and, as to each of the flow paths $B_1-C_1$ and $B_2-C_2$ respectively, they are as previously described and may include fixed film growth media, etc. As in the previously described embodiment of the process, regenerated activated sludge is returned from the respective biological degradation zones ($C_1$ and $C_2$) to the initial absorption zone (A) and to the respective sequenced absorption zones ($B_1$ and $B_2$). Similarly, the respective sequenced absorption zones ($B_1$ and $B_2$) may comprise a plurality of sub-zones, ($B_1$, $B'_1$ and $B_2$, $B'_2$ respectively) each sub-zone absorptively transporting soluble oxygen demand of the wastewater entering such sub-zone until the wastewater flowing from the last sub-zone contains no more than twenty percent of the biochemical oxygen demand of the original influent wastewater into the process. Typically, the retention time of the biomass in the sequenced absorption zone ($B_1$ and $B_2$) respectively are substantially equal to the quescent settling time.

What is claimed is:

1. A continuous inflow, intermittent flow path, sequential cycle, activated sludge waste water process for treating wastewater, comprising the steps of:
   (a) continuously receiving wastewater into a first zone (A) into which activated sludge from a subsequent zone is mixed and retaining said wastewater in said first zone for a period of from at least approximately two to 20 minutes sufficient to form a non-bulking sludge and absorb biodegradable dissolved compounds into the activated sludge;
   (b) passing wastewater from the first zone (A) into a second zone (B) during at least a first aerating time period into which second zone oxygen is transferred into the wastewater, and passing wastewater into said second zone during a second quiescent time period during which settling of sludge is caused by maintaining a quiescent condition in said second zone;
   (c) passing wastewater from the second zone (B) into a third zone (C) during said first and second time periods, the wastewater passing into the third zone being characterized in that it has less than approximately twenty percent of the biochemical oxygen demand the wastewater originally contained and further characterized in that sludge associated therewith is non-bulking and has a high settling velocity, said third zone (C) being aerated during the first aerating period of time to regenerate the absorption capacity of the sludge and being settled during the second quiescent period of time;
   (d) decanting the upper portion of the wastewater from the third zone (C) during a third decanting period of time during which there is no inflow into the second zone (B) from the first zone (A); and
   (e) repeating in cyclic manner steps (b), (c) and (d), the operation of said steps being characterized as a cyclically aerated process, influent wastewater being retained in or before the first zone (A) or directed elsewhere therefrom during the third decanting time period.

2. The process of claim 1 wherein the second zone (B) and the third zone (C) are in free fluid communication with each other.

3. The process of claim 2 wherein oxygen is transferred into the wastewater in the third zone (C) regenerating the activated sludge and inducing backflow of regenerated sludge from the third zone (C) to the second zone (B).

4. The process of claim 3 wherein regenerated activated sludge is returned from the third zone (C) to the first zone (A) and to the second zone (B).

5. The process of claim 3 wherein the second zone (B) comprises additionally a fixed film growth support matrix which occupies from approximately twenty to approximately 90 percent of the portion of the second zone (B) below the bottom water level.

6. The process of claim 5 wherein the fixed film growth support matrix is moveable.

7. The process of claim 3 wherein the second zone (B) comprises a plurality of sub-zones, (B,B') each sub-zone absorptively transporting soluble biochemical oxygen demand of the wastewater entering such sub-zone until the wastewater flowing from the last sub-zone contains no more than twenty percent of the biochemical oxygen demand of the original influent wastewater into the process.

8. The process of claim 3 wherein the hydraulic retention time at mean flow conditions and the designated bottom water level in the second zone (B) is substantially equal to the second quiescent time.

9. The process of claim 3 comprising the further step of adding acetic acid to the second zone for thereby improving the phosphorus removal characteristics of the process.

10. The process of claim 1 wherein regenerated activated sludge is returned from the third zone (C) to the first zone (A) and to the second zone (B).

11. The process of claim 1 wherein the second zone (B) comprises additionally a fixed film growth support matrix which occupies from approximately twenty to approximately 90 percent of the portion of the second zone (B) below the bottom water level.

12. The process of claim 11 wherein the fixed film growth support matrix is moveable.

13. The process of claim 1 wherein the second zone (B) comprises a plurality of sub-zones, (B,B') each sub-zone absorptively transporting soluble biochemical oxygen demand of the wastewater entering such sub-zone until the wastewater flowing from the last sub-zone contains no more than twenty percent of the biochemical oxygen demand of the original influent wastewater into the process.

14. The process of claim 1 wherein the hydraulic retention time at mean flow conditions and the designated bottom water level in the second zone (B) is substantially equal to the second quiescent time.

15. The process of claim 1 comprising the further step of adding acetic acid to the second zone for thereby improving the phosphorus removal characteristics of the process.

16. A process for treating municipal wastewater to reduce biochemical oxygen demand and remove ammonia, nitrate nitrogen and phosphorus, comprising the steps of:
   (a) in a first zone (A) injecting regenerated activated sludge from a subsequent zone;

(b) flowing wastewater from the first zone (A) to a second aerated zone (B) into which additional regenerated activated sludge is introduced;

(c) flowing wastewater from the second zone (B) to a third zone (C) which is aerated to regenerate the activated sludge absorption capacity which is injected into the first zone (A) and introduced into the second zone (B);

(d) settling the sludge and particulate matter in the second zone (B) and the third zone (C) and thereafter decanting fully wastewater from the upper layers of the third zone (C), there being no inflow from the first zone (A) to the second zone (B) during decantation; and (e) cyclically repeating steps (b), (c) and (d).

17. The process of claim 16 wherein the second zone (B) and the third zone (C) are in free fluid communication with each other.

18. The process of claim 17 wherein oxygen is transferred into the wastewater in the third zone (C) regenerating the absorptive capacity of the activated sludge and including backflow of regenerated sludge from the third zone (C) to the second zone (B).

19. The process of claim 16 wherein the second zone (B) comprises additionally a fixed film growth support matrix which occupies from approximately twenty to approximately 90 percent of the portion of the second zone (B) below the bottom water level.

20. The process of claim 19 wherein the fixed film growth support matrix is moveable.

21. The process of claim 16 wherein the hydraulic retention time at mean flow conditions and the designated bottom water level in the second zone (B) is substantially equal to the settling time.

22. The process of claim 16 comprising the further step of adding acetic acid to the second zone for thereby improving the phosphorus removal characteristics of the process.

23. The process of claim 16 wherein the floc load of the influent into the first zone is less than approximately 250 mg chemical oxygen demand/gm MLVSS.

24. The process of claim 16 wherein multiple stage absorptive reaction, metabolism of the removed biochemical oxygen demand associated with sludge, regeneration of the absorptive capacity of the sludge, and settling of solids and decanting of wastewater is carried out in a single water retaining structure having partitions dividing said zones from each other.

25. A process for treating wastewater having a high biochemical oxygen demand of from approximately 250 mg/L to approximately 2,000 mg/L and a high soluble biochemical oxygen demand fraction of approximately 50% or more, comprising the steps of:

(a) in a first zone (A) injecting regenerated activated sludge from a subsequent zone;

(b) flowing wastewater from the first zone (A) to a second aerated zone (B) into which additional regenerated activated sludge is introduced, said second zone comprising a multiplicity of sub-zones each of which is aerated and into each of which additional regenerated activated sludge is introduced;

(c) flowing wastewater from the second zone (B) to a third zone (C) which is aerated to regenerate the activated sludge which is injected into the first zone (A) and introduced into the second zone (B);

(d) settling the sludge and particulate matter in the second zone (B) and the third zone (C) and thereafter decanting fully wastewater from the upper layers of the third zone (C), there being no inflow from the first zone (A) to the second zone (B) during decantation; and (e) cyclically repeating steps (b), (c) and (d).

26. The process of claim 25 wherein the second zone (B) and the third zone (C) are in free fluid communication with each other.

27. The process of claim 26 wherein oxygen is transferred into the wastewater in the third zone (C) regenerating the absorptive capacity of the activated sludge and inducing backflow of regenerated sludge from the third zone (C) to the second zone (B).

28. The process of claim 25 wherein the second zone (B) comprises additionally a fixed film growth support matrix which occupies from approximately twenty to approximately 90 percent of the portion of the second zone (B) below the bottom water level.

29. The process of claim 28 wherein the fixed film growth support matrix is moveable.

30. The process of claim 25 wherein the hydraulic retention time at mean flow conditions and the designated bottom water level in the second zone (B) is substantially equal to the settling time.

31. The process of claim 25 wherein multiple stage absorptive reaction, metabolism of the removed biochemical oxygen demand associated with sludge, regeneration of the absorptive capacity of the sludge, and settling of solids and decanting of wastewater is carried out in a single water retaining structure having partitions dividing said zones from each other.

32. A process for treating wastewater comprising the steps of:

(a) continuously receiving wastewater into a initial absorption zone (A) into which activated sludge from a subsequent zone is mixed and retaining said wastewater in said initial absorption zone for a period of from at least approximately two to 20 minutes sufficient to form a non-bulking sludge and absorb biodegradable dissolved compounds into the activated sludge;

(b) passing wastewater from the initial absorption zone (A) into at least one of two or more sequenced absorption zones ($B_1$, $B_2$) during aeration thereof and passing wastewater into said respective sequenced absorption zones during respective quiescent time periods during which settling of sludge is caused in the respective sequenced absorption zones by maintaining a quiescent condition in said sequenced absorption zones;

(c) passing wastewater from one sequenced absorption zone ($B_1$) into one biological degradation zone ($C_1$) and passing wastewater from another sequenced absorption zone ($B_2$) into another biological degradation zone ($C_2$) the wastewater passing into the biological degradation zones being characterized in that it has less than approximately twenty percent of the biochemical oxygen demand the wastewater originally contained and further characterized in that sludge associated there with is non-bulking and has a high settling velocity, said biological degradation zones ($C_1$, $C_2$) being aerated to regenerate the absorption capacity of the sludge and being settled during respective quiescent periods; and (d) decanting the upper portion of the wastewater from one biological degradation zone ($C_1$) during one period of time and decanting the upper portion of the wastewater from the other biological degradation zone ($C_2$) during another period of time, there being no inflow from the intial absorption zone (A) into the one sequenced absorption zone ($B_1$) during the decantation of the one biological degradation zone ($C_1$), and there being no inflow into the other sequenced absorption zone ($B_2$) from the initial absorption zone (A) during the decantation of the other biological degradation zone ($C_2$), the decantation of the respective biological absoption zones ($C_1$ and $C_2$) being at different time periods.

33. The process of claim 32 wherein the sequenced absorption zones ($B_1$ and $B_2$) and the biological degradation zones ($C_1$ and $C_2$) respectively are in free fluid communication with each other.

34. The process of claim 33 wherein aeration is effected by inducing backflow of regenerated sludge from the biological degradation zones ($C_1$ and $C_2$) to the respective sequenced absorption zones ($B_1$ and $B_2$).

35. The process of claim 33 wherein regenerated activated sludge is returned from the biological degradation zones ($C_1$ and $C_2$) to the initial absorption zone (A) and to the respective sequenced absorption zones ($B_1$ and $B_2$).

36. The process of claim 33 wherein the respective sequenced absorption zones ($B_1$ and $B_2$) comprises additionally a fixed film growth support matrix which occupies from approximately twenty to approximately 90 percent of the portion of the respective sequenced absorption zones ($B_1$ and $B_2$) below the bottom water level.

37. The process of claim 36 wherein the fixed film growth support matrix is moveable.

38. The process of claim 33 wherein the respective sequenced absorption zones ($B_1$ and $B_2$) comprises a plurality of sub-zones, ($B_1$, $B'_1$ and $B_2$, $B'_2$ respectively) each sub-zone absorptively transporting soluble biochemical oxygen demand of the wastewater entering such sub-zone until the wastewater flowing from the last sub-zone contains no more than twenty percent of the biochemical oxygen demand of the original influent wastewater into the process.

39. The process of claim 33 wherein the hydraulic retention time at mean flow conditions and the designated bottom water level in the respective sequenced absorption zones ($B_1$ and $B_2$) is substantially equal to the respective settling times.

40. The process of claim 33 comprising the further step of adding acetic acid to the respective sequenced absorption zone for thereby improving the phosphorus removal characteristics of the process.

41. The process of claim 32 wherein regenerated activated sludge is returned from the respective biological degradation zones ($C_1$ and $C_2$) to the initial absorption zone (A) and to the respective sequenced absorption zones ($B_1$ and $B_2$).

42. The process of claim 32 wherein the sequenced absorption zones ($B_1$ and $B_2$) respectively comprise additionally a fixed film growth support matrix which occupies from approximately twenty to approximately 90 percent of the portion of the respective sequenced absorption zones ($B_1$ and $B_2$) below the bottom water level.

43. The process of claim 42 wherein the fixed film growth support matrix is moveable.

44. The process of claim 32 wherein the respective sequenced absorption zone ($B_1$ and $B_2$) comprises a plurality of sub-zones, ($B_1$, $B'_1$ and $B_2$, $B'_2$ respectively) each sub-zone absorptively transporting soluble biochemical oxygen demand of the wastewater entering such sub-zone until the wastewater flowing from the last sub-zone contains no more than twenty percent of the biochemical oxygen demand of the original influent wastewater into the process.

45. The process of claim 32 wherein the retention time of the biomass in the sequenced absorption zone ($B_1$ and $B_2$) respectively are substantially equal to the quiescent settling time.

46. The process of claim 32 comprising the further step of adding acetic acid to the second zone near the beginning of the first time period.

47. The process of claim 1, claim 16, claim 25 or claim 32 further comprising the steps of positioning in the second aeration absorption zone (B) a rotatable fixed film growth support matrix and rotating the matrix in a direction to effectively introduce regenerated activated sludge from the third zone (C) into the second zone (B).

48. The process of claim 47 wherein the rotatable fixed film growth support matrix is in the form of a rotatable drum-shaped body having a multiplicity of surface forming elements 190 mounted for rotation on a shaft 192 and rotating the body in a direction such that the portion of the body most adjacent the fluid communication means between the second zone (B) and the third zone (C) rotates away from said fluid communication means to effectively pump sludge from the third zone (C) to the second zone (B) and mix the sludge in the second zone (B).

49. The process of claim 1, claim 16, claim 25 or claim 32 further comprising the step of substantially continuously aerating the first zone A or zone B or both into which regenerated activated sludge is substantially continuously introduced into zone A and additionally into zone B.

* * * * *